US010487761B2

(12) United States Patent
Shibata et al.

(10) Patent No.: US 10,487,761 B2
(45) Date of Patent: Nov. 26, 2019

(54) VEHICLE CONTROL APPARATUS AND VEHICLE CONTROL METHOD

(71) Applicant: Hitachi Automotive Systems, Ltd., Hitachinaka-shi, Ibaraki (JP)

(72) Inventors: Takeo Shibata, Hitachinaka (JP); Hiroshi Kuroda, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 445 days.

(21) Appl. No.: 14/894,181

(22) PCT Filed: Mar. 14, 2014

(86) PCT No.: PCT/JP2014/056817
§ 371 (c)(1),
(2) Date: Nov. 25, 2015

(87) PCT Pub. No.: WO2014/192367
PCT Pub. Date: Dec. 4, 2014

(65) Prior Publication Data
US 2016/0123261 A1    May 5, 2016

(30) Foreign Application Priority Data

May 31, 2013    (JP) ................. 2013-114825

(51) Int. Cl.
*F02D 41/04*    (2006.01)
*B60W 10/04*    (2006.01)
(Continued)

(52) U.S. Cl.
CPC ........... *F02D 41/042* (2013.01); *B60W 10/04* (2013.01); *B60W 10/10* (2013.01); *B60W 30/16* (2013.01);
(Continued)

(58) Field of Classification Search
CPC ...... B60W 10/04; B60W 10/10; B60W 30/16; F02D 2200/501; F02D 2200/602;
(Continued)

(56) References Cited

U.S. PATENT DOCUMENTS 4,127,249 A * 11/1978 Lambregts ............... G01D 1/16
                                                              244/191
6,371,889 B1 * 4/2002 Kuroda .................. B60K 6/485
                                                              477/167
(Continued)

FOREIGN PATENT DOCUMENTS

DE    10 2005 062 450 A1    7/2006
DE    10 2009 002 521 A1    10/2010
(Continued)

OTHER PUBLICATIONS

Watanabe JP 2011-046272 machine translation.*
(Continued)

*Primary Examiner* — Carl C Staubach
(74) *Attorney, Agent, or Firm* — Crowell & Moring LLP

(57) ABSTRACT

A vehicle control apparatus that makes it possible to attempt fuel consumption improvement and exhaust gas reduction effectively without causing a sense of incompatibility in the driver is provided. When traveling following the preceding vehicle, kinetic energy required for an own vehicle in future is predicted on the basis of kinetic energy of the own vehicle, a velocity of a preceding vehicle, and a distance between the own vehicle and the preceding vehicle. It is determined whether there is kinetic energy enough for the own vehicle to be able to follow the preceding vehicle with inertial traveling, on the basis of the predicted kinetic energy and current kinetic energy. When it is determined that the kinetic energy is sufficient and the driving and traveling state of the
(Continued)

own vehicle satisfies other traveling idling reduction conditions, control of stopping the engine is exercised.

4 Claims, 9 Drawing Sheets

(51) Int. Cl.
*B60W 10/10* (2012.01)
*B60W 30/16* (2012.01)
*F02D 29/02* (2006.01)
*F02N 11/08* (2006.01)
*F02D 41/06* (2006.01)
*F02D 41/08* (2006.01)
*B60W 30/18* (2012.01)

(52) U.S. Cl.
CPC ....... *B60W 30/18072* (2013.01); *F02D 29/02* (2013.01); *F02D 41/045* (2013.01); *F02D 41/065* (2013.01); *F02D 41/08* (2013.01); *F02N 11/0837* (2013.01); *B60W 2540/10* (2013.01); *B60W 2550/302* (2013.01); *B60W 2550/308* (2013.01); *F02D 2200/501* (2013.01); *F02D 2200/602* (2013.01); *F02D 2200/70* (2013.01); *F02N 2200/0801* (2013.01); *F02N 2200/125* (2013.01); *Y02T 10/48* (2013.01); *Y02T 10/76* (2013.01)

(58) Field of Classification Search
CPC .... F02D 2200/70; F02D 29/02; F02D 41/042; F02D 41/045; F02D 41/065; F02D 41/08; F02N 11/0837; F02N 2200/0801; F02N 2200/125
See application file for complete search history.

(56) References Cited

U.S. PATENT DOCUMENTS

| | | | |
|---|---|---|---|
| 9,278,692 B2* | 3/2016 | Doering | B60K 6/48 |
| 2002/0096137 A1* | 7/2002 | Kobayashi | B60K 6/485 |
| | | | 123/179.4 |
| 2006/0142121 A1* | 6/2006 | Moriya | F02N 11/0833 |
| | | | 477/199 |
| 2008/0004807 A1* | 1/2008 | Kimura | B60W 40/02 |
| | | | 701/301 |
| 2010/0268433 A1* | 10/2010 | Ueda | F02D 31/001 |
| | | | 701/102 |
| 2011/0132134 A1* | 6/2011 | Kim | F02D 11/02 |
| | | | 74/514 |
| 2012/0016573 A1* | 1/2012 | Ellis | B60K 31/0008 |
| | | | 701/112 |
| 2012/0046841 A1* | 2/2012 | Wurthner | B60W 10/02 |
| | | | 701/54 |
| 2012/0239268 A1* | 9/2012 | Chen | B60W 30/146 |
| | | | 701/96 |
| 2012/0330505 A1* | 12/2012 | Tsumori | B60W 10/06 |
| | | | 701/36 |
| 2013/0173113 A1* | 7/2013 | Takiguchi | B60K 26/021 |
| | | | 701/36 |
| 2013/0179053 A1* | 7/2013 | Matsunaga | B60W 10/02 |
| | | | 701/112 |
| 2013/0296120 A1* | 11/2013 | Reed | B60W 10/02 |
| | | | 477/5 |
| 2014/0067225 A1* | 3/2014 | Lee | B60W 50/0097 |
| | | | 701/93 |
| 2015/0191170 A1* | 7/2015 | Johansson | B60K 31/00 |
| | | | 701/94 |
| 2016/0264003 A1* | 9/2016 | Yokoyama | B60K 6/52 |
| 2017/0001640 A1* | 1/2017 | Asakura | B60W 30/16 |
| 2017/0226947 A1* | 8/2017 | Kawakami | F02D 41/08 |
| 2017/0293296 A1* | 10/2017 | Stenneth | G01C 21/3438 |

FOREIGN PATENT DOCUMENTS

| | | |
|---|---|---|
| DE | 11 2011 102 144 T5 | 3/2013 |
| JP | 2003-120339 A | 4/2003 |
| JP | 2006-152965 A | 6/2006 |
| JP | 2010-30430 A | 2/2010 |
| JP | 2010-64576 A | 3/2010 |
| JP | 2010-143304 A | 7/2010 |
| JP | 2011-5920 A | 1/2011 |
| JP | 2011-46272 A | 3/2011 |
| JP | 2012-127265 A | 7/2012 |
| JP | 2012-131292 A | 7/2012 |

OTHER PUBLICATIONS

Daimler AG JP 2012-131292 machine translation.*
International Search Report (PCT/ISA/210) issued in International Application No. PCT/JP2014/056817 dated Jul. 8, 2014, with English translation (Five (5) pages).
Japanese language Written Opinion (PCT/ISA/237) issued in International Application No. PCT/JP2014/056817 dated Jul. 8, 2014 (Four (4) pages).
European Search Report issued in counterpart European Application No. 14805042.0 dated Jan. 30, 2017 (three pages).
Japanese-language Office Action issued in counterpart Japanese Application No. 2015-519700 dated Jul. 5, 2016 with English translation (Thirteen (13) pages).

* cited by examiner

VEHICLE CONTROL APPARATUS AND VEHICLE CONTROL METHOD

TECHNICAL FIELD

The present invention relates to a vehicle control apparatus and a vehicle control method that exercise traveling idling reduction control to stop a vehicle-mounted engine temporarily when a driving and traveling state of an own vehicle satisfies predetermined conditions during traveling following a preceding vehicle.

BACKGROUND ART

In the field of vehicle control in recent years, it has spread to exercise idling reduction control with a principal object of improvement of fuel efficiency and reduction of exhaust gas. In the idling reduction control, the engine is stopped temporarily during stopping or parking of a vehicle or waiting for a traffic light change, and then the engine is re-started when an accelerator pedal is depressed, as described in, for example, PTL 1.

Furthermore, control of stopping an engine during traveling temporarily and then restarting the engine (hereafter referred to as traveling idling reduction control) is also formerly known.

In the conventional traveling idling reduction control, the engine is usually stopped when the driver depresses a brake pedal and the velocity of the own vehicle has become a predetermined velocity or less (low velocity). When the driver has released the brake pedal, the engine is restarted.

PTL 2 discloses control of stopping an engine temporarily when the driving and traveling state of a vehicle satisfies predetermined conditions during traveling and of restarting the engine by utilizing kinetic energy of the vehicle when the driving and traveling state of the vehicle has ceased to satisfy the conditions.

CITATION LIST

Patent Literatures

PTL 1: JP 2010-30430 A
PTL 2: JP 2012-127265 A

SUMMARY OF INVENTION

Technical Problem

Even in a case where there is a preceding vehicle ahead of the own vehicle, timing of engine stop and engine restart depends upon brake pedal manipulation of the driver, in the conventional traveling idling reduction control.

If the timing depends upon the brake pedal manipulation of the driver, the own vehicle has a higher velocity than needed, for example, in a case where the driver depresses the accelerator pedal excessively. As a result, velocity adjustment by the brake pedal manipulation is conducted. It can be said that acceleration corresponding to energy lost by the brake pedal manipulation at this time is a waste.

Furthermore, while the brake pedal is released, the engine is brought into an idling state. Supposing that the engine is restarted by driver's depression of the accelerator pedal from the traveling idling reduction (engine stop) state, therefore, a delay of time required to restart the engine occurs in acceleration of the own vehicle.

For preventing this, it is necessary to start the engine previously in a case where there is a possibility that the driver will depress the accelerator pedal. If the time elapsed until the driver depresses the accelerator pedal becomes long, however, the idling state continues and consequently the fuel is consumed wastefully.

In addition, in the conventional traveling idling reduction control, engine stop is possible only when the own vehicle is traveling at low speed and the engine stop is not conducted when the own vehicle is traveling at high speed. This is because at the time of traveling at high speed a delay time required to start the engine (a required time until the engine is connected to a transmission and a state in which power can be transmitted is reached without causing a shock) becomes so long that it cannot be compensated by a transition time from the driver's brake pedal manipulation to the acceleration pedal manipulation.

The present invention has been made in view of such circumstances. An object of the present invention is to provide a vehicle control apparatus and a vehicle control method that make it possible to suppress energy consumption as far as possible without reducing drivability at the time of traveling following a preceding vehicle and attempt fuel consumption improvement and exhaust gas reduction effectively without causing a sense of incompatibility in the driver.

Solution to Problem

In order to achieve the object, in a vehicle control apparatus according to the present invention, kinetic energy required for an own vehicle in future is predicted when traveling following the preceding vehicle, on the basis of kinetic energy of the own vehicle, a velocity of a preceding vehicle, and a distance between the own vehicle and the preceding vehicle. It is determined whether there is kinetic energy enough for the own vehicle to be able to follow the preceding vehicle with inertial traveling, on the basis of the predicted kinetic energy and current kinetic energy. When it is determined that the kinetic energy is sufficient and the driving and traveling state of the own vehicle satisfies other traveling idling reduction conditions, control of stopping the engine is exercised.

Advantageous Effects of Invention

Even if the driver releases the brake pedal during the traveling idling reduction (engine stop) in the vehicle control apparatus according to the present invention, it is possible to continue to stop the engine in the case where there is kinetic energy enough for the own vehicle to follow the preceding vehicle in inertial traveling (hereafter abbreviated to kinetic energy for following). In the case where the kinetic energy for following becomes insufficient while the engine is stopped, the engine is restarted. Therefore, the engine can be restarted before the driver depresses the accelerator pedal. As a result, fuel consumption improvement and exhaust gas reduction can be attempted effectively without causing a sense of incompatibility in the driver.

Problems, configurations and action effects other than those described above will be elucidated by an embodiment described below.

BRIEF DESCRIPTION OF DRAWINGS

FIG. 3 is

DESCRIPTION OF EMBODIMENTS

Hereafter, an embodiment of the present invention will be described with reference to the drawings.

Figure 1:
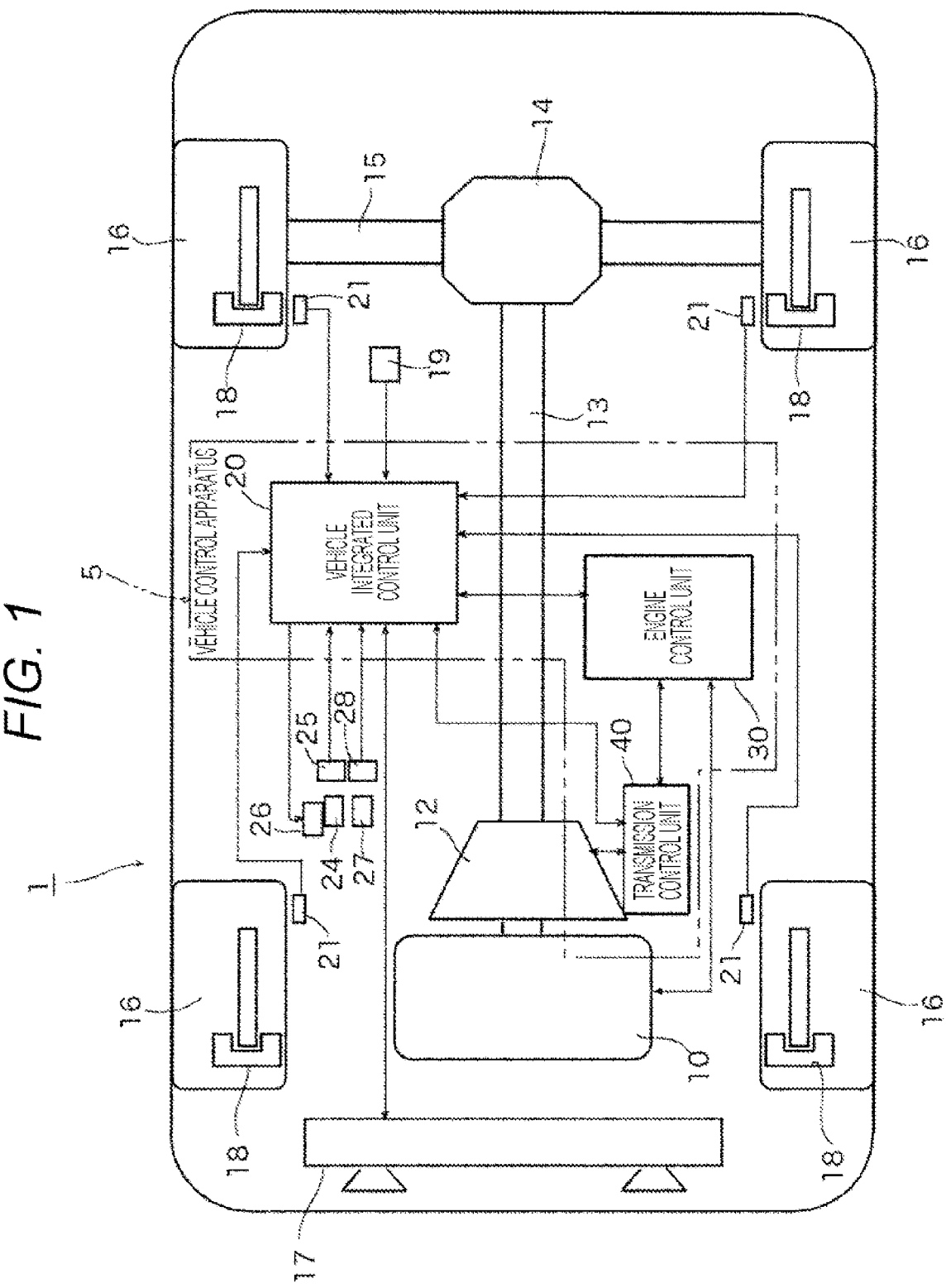
FIG. 1 is a schematic configuration diagram illustrating an embodiment of a vehicle control apparatus according to the present invention together with a vehicle to which the embodiment is applied.
Figure 2:
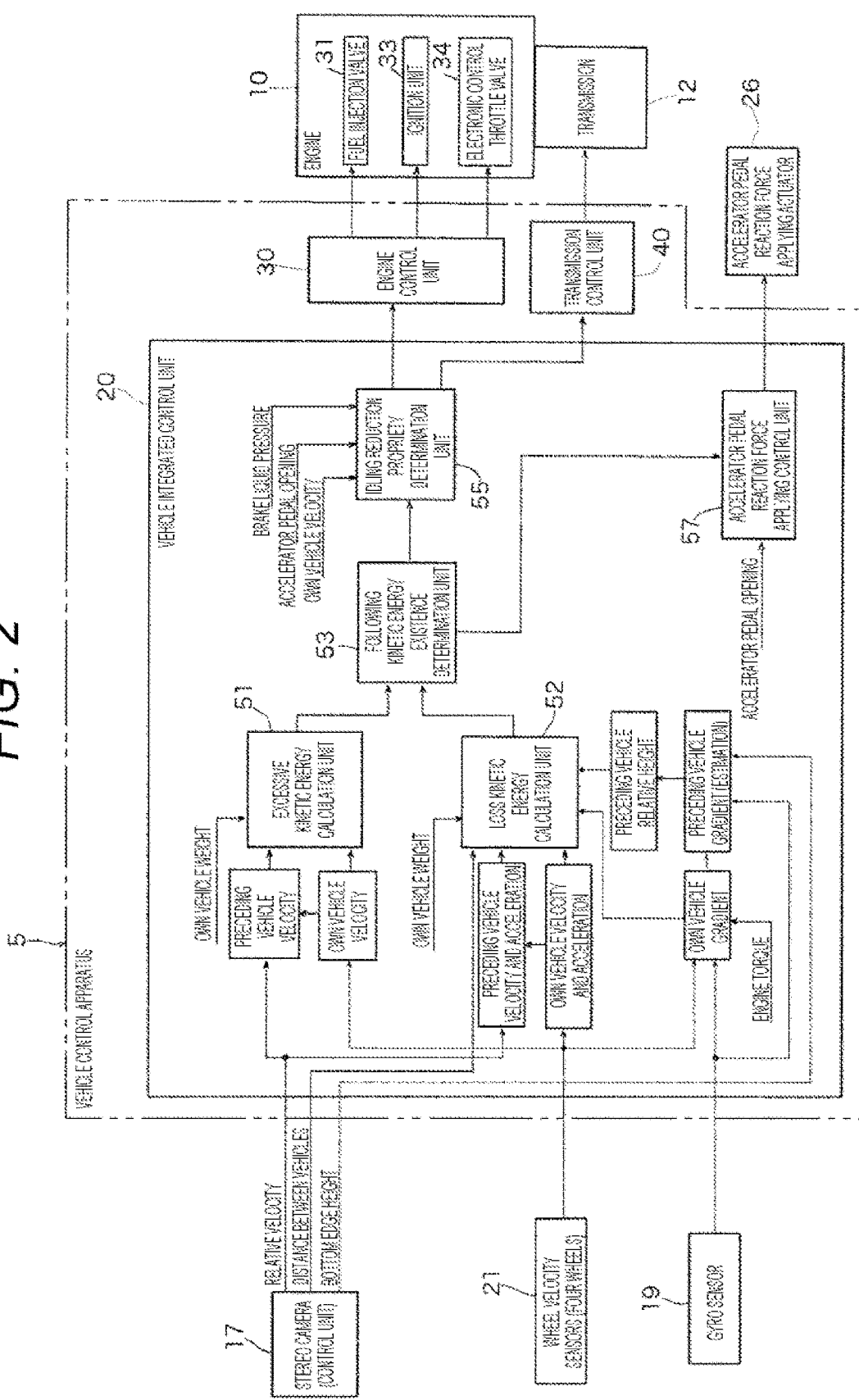
FIG. 2 is a function block diagram illustrating a principal portion of the vehicle control apparatus illustrated in FIG. 1.

FIG. 1 is a schematic configuration diagram illustrating an embodiment of a vehicle control apparatus according to the present invention together with a vehicle to which the embodiment is applied. FIG. 2 is a function block diagram illustrating a principal portion of the vehicle control apparatus illustrated in FIG. 1.

A vehicle 1 in the illustrated example is a rear wheel drive vehicle having a typical configuration including, for example, direct injection gasoline engine 10 functioning as a power source for traveling, an automatic transmission 12 which can be connected to/disconnected from the engine 10, a propeller shaft 13, a differential gear 14, a drive shaft 15, four wheels 16, and a hydraulic brake 18.

In the vehicle 1, control units each incorporating a microcomputer, such as a vehicle integrated control unit 20, an engine control unit 30, and a transmission control unit 40, are disposed in predetermined regions. The vehicle integrated control unit 20 forms a principal portion of a vehicle control apparatus 5 according to the present invention, and takes charge of integrated control on the apparatuses, actuators, and devices mounted and disposed on the vehicle 1. The engine control unit 30 takes charge of engine control. The transmission control unit 40 takes charge of transmission control.

The respective control units and apparatuses, actuators, and devices including sensors described later are adapted to transmit and receive signals and data through a LAN (CAN) in the vehicle.

A stereo camera 17 is disposed in a front portion of the vehicle 1. The stereo camera 17 has a control unit portion incorporating a microcomputer. The control unit portion calculates a relative velocity of a preceding vehicle to the own vehicle, a distance from the own vehicle to a preceding vehicle ahead of the own vehicle, an obstacle, a vehicle on the opposite line, or the like (a distance between vehicles or the like), and a height of a bottom edge of a vehicle body of the preceding vehicle (a height position seen from the own vehicle) on the basis of a video picked up. The control unit portion supplies them to the vehicle integrated control unit 20.

Signals from four wheel velocity sensors 21 configured to detect rotation velocities of the respective wheels 16, an accelerator pedal sensor 25 configured to detect an opening (depression amount) of an accelerator pedal 24, a brake sensor 28 configured to detect a depression amount of a brake pedal 27, and a gyro sensor 19 configured to detect a gradient of the own vehicle are also supplied to the vehicle integrated control unit 20.

By the way, the illustrated vehicle 1 is an example of a vehicle to which the present invention can be applied. The illustrated vehicle 1 does not restrict the configuration of a vehicle to which the present invention can be applied.

For example, the vehicle may be a vehicle adopting a continuously variable transmission (CVT) instead of the above-described automatic transmission 12. The above-described relative velocity and the distance between vehicles may be found by using one or a combination of a plurality of ones among a laser radar, a millimeter-wave radar, a monocular camera, and so on instead of the stereo camera 17 as an outside recognition sensor.

Furthermore, the depression amount of the brake pedal 27 is adapted to be detected by a liquid pressure sensor (not illustrated) configured to detect a brake liquid pressure in a control system of the brake 18 as well besides the brake sensor 28.

The engine control unit 30 is supplied with various signals representing the drive state (such as the number of revolutions of the engine, an intake air volume, a throttle opening, and an in-cylinder pressure) of the engine 10 or various signals that become bases when finding them, from the sensors disposed in the engine 10 besides signals and data from the control units such as the vehicle integrated control unit 20 and the transmission control unit 40. As illustrated in FIG. 2 described later, the engine control unit 30 supplies predetermined control signals toward a fuel injection valve 31, an ignition unit 33 including an ignition coil and an ignition plug, an electronic control throttle valve 34 and so on, on the basis of the various signals and executes fuel injection (volume) control, ignition (time) control, throttle opening control, and so on.

In addition to the above-described configurations, a reaction force actuator 26 configured to apply reaction force of manipulation in addition to ordinary restoration force to the accelerator pedal 24 is provided in the vehicle 1 in the present embodiment. The actuator 26 is supplied with a control signal from the vehicle integrated control unit 20.

A feature of the vehicle control apparatus 5 according to the embodiment of the present invention is that when traveling following a preceding vehicle the vehicle control apparatus 5 predicts kinetic energy required for the own vehicle in the future on the basis of kinetic energy of the own vehicle, the velocity of the preceding vehicle, and a distance between the preceding vehicle and the own vehicle. The vehicle control apparatus 5 determines whether there is kinetic energy (kinetic energy for following) enough for the own vehicle to be capable of following the preceding vehicle with inertial traveling on the basis of the predicted kinetic energy and current kinetic energy. When it is determined that there is sufficient kinetic energy for following and the driving and traveling state of the own vehicle satisfies other traveling idling reduction conditions, the vehicle control apparatus 5 conducts traveling idling reduction of stopping the engine temporarily.

The determination whether the kinetic energy for following is sufficient or insufficient will now be described with reference to FIGS. 3(A) and 3(B) and FIGS. 4(A) and 4(B).

Figure 3A:
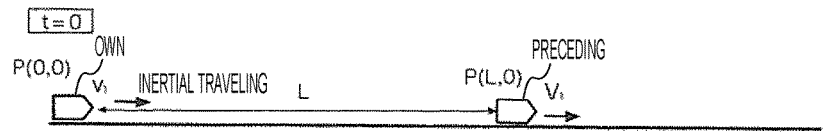
FIGS. 3A and 3B are a diagram used to describe a relation between the own vehicle and a preceding vehicle at the time of traveling following the preceding vehicle.
Figure 3B:
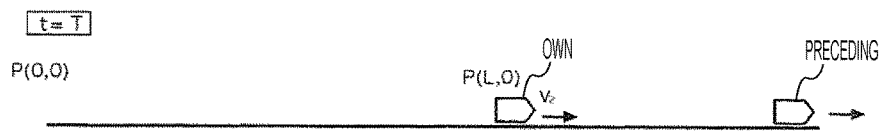

FIGS. 3(A) and 3(B) show states at the time when the own vehicle and the preceding vehicle are traveling on a flat road. FIG. 3(A) represents a relation between the own vehicle and the preceding vehicle at time t=0. FIG. 3(B) represents expectation at the time when the own vehicle reaches a coordinate P(L, 0) with inertial traveling from time t=0 and a coordinate P(0, 0). At that time, time is t=T (seconds). In FIGS. 3(A) and 3(B) (and FIGS. 4(A) and 4(B) described later), v1: current velocity of own vehicle
V1: current velocity of preceding vehicle
L: current distance between vehicles
v2: velocity of own vehicle after T seconds As illustrated in FIG. 2, the velocity of the own vehicle is calculated on the basis of signals from the four wheel velocity sensors 21 and so on. The velocity of the preceding vehicle is calculated on the basis of the velocity of the own vehicle and a relative velocity obtained from the stereo camera 17.

It is appreciated from FIGS. 3(A) and 3(B) that the own vehicle can follow the preceding vehicle with inertial traveling if a relation of the following expression (1) is satisfied.

$$v2 > V1 \quad (1)$$

Denoting a weight of the own vehicle by m and a predicted deceleration by A, the following expression (2) can be led out from expression (1).

By the way, the weight m of the own vehicle is calculated as a weight obtained by adding a mounted weight at the time of driving this time to a fixed value in internal processing. Since inertial traveling is conducted, the predicted deceleration A can be calculated on the basis of a change rate of the velocity of the own vehicle. The predicted deceleration A is represented as, for example, 0.1 [G].

[Mathematical Formula 1]

$$\frac{1}{2}mv_1^2 - \frac{1}{2}mV_1^2 > mAL \quad (2)$$

A first term on a left side of expression (2) represents current kinetic energy of the own vehicle. A second term on the left side represents minimum kinetic energy required when the own vehicle passes through the coordinate P(L, 0), which is the current position of the preceding vehicle. In other words, the second term on the left side represents predicted kinetic energy in the case where the own vehicle is supposed to travel at the velocity of the preceding vehicle. Therefore, the left side represents excess kinetic energy, which is a difference between the kinetic energy of the own vehicle and kinetic energy in the case where the own vehicle is supposed to travel at the velocity of the preceding vehicle.

A right side of expression (2) represents loss kinetic energy of the own vehicle in a case where the vehicle 1 conducts inertial traveling with the engine stopped until the vehicle 1 arrives at the coordinate P(L, 0), which is the current position of the preceding vehicle, from the coordinate P(0, 0), which is the current position.

Therefore, expression (2) represents a relation that the excess kinetic energy of the own vehicle is larger than the loss kinetic energy. If expression (2) is satisfied, it can be said that the kinetic energy for following is sufficient and the own vehicle can pass through the coordinate P(L, 0) at a velocity of at least V1 with inertial traveling.

Figure 4A:
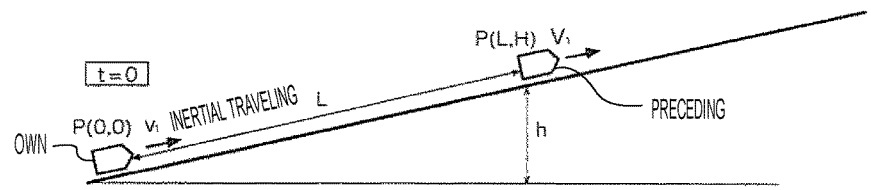
FIGS. 4A and 4B are a diagram used to describe a relation between the own vehicle and a preceding vehicle at the time of traveling following the preceding vehicle on a sloping road.
Figure 4B:
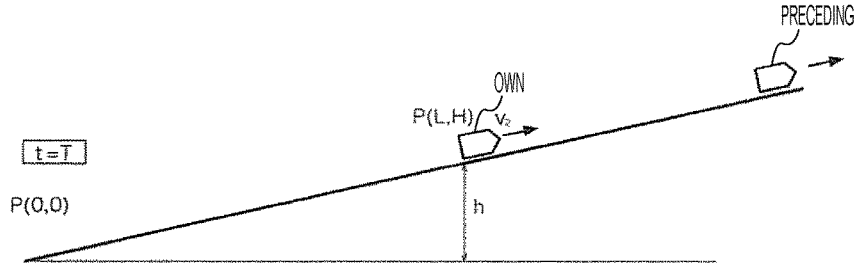

On the other hand, a state at the time of traveling on an upward slope is illustrated in FIGS. 4(A) and 4(B). Taking a traveling resistance and a gradient into consideration as illustrated in FIGS. 4(A) and 4(B), expression (1) can also be represented by a relation expression like expression (3).

In FIGS. 4A and 4B, h is a relative height of the preceding vehicle. The relative height h of the preceding vehicle is calculated on the basis of the gradient of the own vehicle and the preceding vehicle and a distance L between vehicles. The gradient of the preceding vehicle is calculated (estimated) on the basis of the velocity and an engine torque of the own vehicle, a height position of a bottom edge of a vehicle body of the preceding vehicle obtained from the stereo camera 17, and a gradient of the own vehicle obtained from the gyro sensor 19 and so on, as illustrated in FIG. 2.

In expression (3),
a(t): traveling resistance at time t
v(t): the velocity of the own vehicle at the time t
g: gravitational acceleration

[Mathematical Formula 2]

$$\frac{1}{2}mv_1^2 - \frac{1}{2}mV_1^2 > m\int_0^T a(t)v(t)\,dt + mgh \quad (3)$$

A left side of expression (3) represents current kinetic energy of the own vehicle in the same way as expression (2). A second term on the left side represents minimum kinetic energy required when the own vehicle passes through the coordinate P(L, H), which is the current position of the preceding vehicle. In other words, the second term on the left side represents predicted kinetic energy in the case where the own vehicle is supposed to travel at the velocity of the preceding vehicle. Therefore, the left side represents excess kinetic energy, which is a difference between the kinetic energy of the own vehicle and kinetic energy in the case where the own vehicle is supposed to travel at the velocity of the preceding vehicle.

A first term on a right side represents energy lost by a traveling resistance in a case where the own vehicle conducts inertial traveling with the engine stopped from the coordinate P(0, 0) to the coordinate P(L, H). The first term on the right side corresponds to the right side of expression (2). A second term on the right side represents relative position energy at the coordinate P(L, H). In other words, the right side of expression (3) represents loss energy required for the own vehicle to arrive at the coordinate P(L, H) from the coordinate P(0, 0).

Therefore, expression (3) represents a relation that the excess kinetic energy of the own vehicle is larger than the loss kinetic energy. If expression (3) is satisfied, it can be said that the kinetic energy for following is sufficient and the own vehicle can pass through the coordinate P(L, H) at a velocity of at least V1 with inertial traveling.

The traveling idling reduction control at the time of traveling following the preceding vehicle executed by the vehicle control apparatus 5 according to the present embodiment will now be described in detail.

The vehicle integrated control unit 20 forms a principal portion of the vehicle control apparatus 5 according to the present embodiment. As illustrated in the function block diagram of FIG. 2, the vehicle integrated control unit 20 includes an excess kinetic energy calculation unit 51, a loss kinetic energy calculation unit 52, a following kinetic energy existence determination unit 53, an idling reduction propriety determination unit 55, and an accelerator pedal reaction force applying control unit 57.

The excess kinetic energy calculation unit 51 calculates excess kinetic energy on the basis of the weight m of the own vehicle and the velocity v of the own vehicle. The excess kinetic energy is a difference between the kinetic energy of the own vehicle and kinetic energy in the case where the own vehicle is supposed to travel at the velocity V of the preceding vehicle.

The loss kinetic energy calculation unit 52 calculates loss kinetic energy of the own vehicle on the basis of the weight m of the own vehicle, the predicted deceleration A or a traveling resistance of the own vehicle, the distance L between the preceding vehicle and the own vehicle, and the relative height h of the preceding vehicle.

The following kinetic energy existence determination unit 53 determines whether kinetic energy enough for the own vehicle to follow the preceding vehicle with inertial traveling (kinetic energy for following) is sufficient or insufficient on the basis of the excess kinetic energy and the loss kinetic energy. If the excess kinetic energy is larger than the loss kinetic energy, it is determined that the kinetic energy for following is sufficient. If the excess kinetic energy is smaller than the loss kinetic energy, it is determined that the kinetic energy for following is insufficient.

(a) When it is determined that the kinetic energy for following is sufficient and the driving and traveling state of the own vehicle satisfies other idling reduction conditions (such as, for example, the accelerator pedal 24 is not depressed), the idling reduction propriety determination unit 55 outputs an engine stop instruction to the engine control unit 30.

(b) When it is determined that the kinetic energy for following is insufficient during idling reduction (engine stop), the idling reduction propriety determination unit 55 outputs an engine restart instruction to the engine control unit 30.

(c) When depression of the accelerator pedal 24 is detected during the engine stop, the idling reduction propriety determination unit 55 outputs an engine restart instruction to the engine control unit 30.

(d) Even in a case where the kinetic energy for following is determined to be insufficient, the idling reduction propriety determination unit 55 outputs an engine stop instruction to the engine control unit 30, while depression of the brake pedal 27 is detected at the time of traveling at low velocity.

(e) In a case where the kinetic energy for following is determined to be sufficient at the time of traveling at high velocity, the idling reduction propriety determination unit 55 outputs an engine stop instruction to the engine control unit 30, as long as other idling reduction conditions (such as, for example, that the accelerator pedal 24 is not depressed) are satisfied no matter whether the brake pedal is depressed.

When it is determined that the kinetic energy for following is sufficient, the accelerator pedal reaction force applying control unit 57 actuates the accelerator pedal reaction force applying actuator 26 and causes the actuator 26 to apply manipulation force in addition to the ordinary restoration force to the accelerator pedal 24. When it is determined that the kinetic energy for following is insufficient, and when the accelerator pedal 24 is depressed increasingly though the reaction force of manipulation is continued to be applied, or when the accelerator pedal 24 is continued to be depressed over at least predetermined time, the accelerator pedal reaction force applying control unit 57 exercises control to stop the application of the reaction force of manipulation conducted by the reaction force applying actuator 26.

The manipulation of applying reaction force of manipulation to the accelerator pedal 24 is conducted to urge the driver to release the accelerator pedal 24 to travel with inertia by applying the reaction force to the accelerator pedal 24. When the accelerator pedal 24 is depressed increasingly though the reaction force of manipulation is continued to be applied, or when the accelerator pedal 24 is continued to be depressed over at least predetermined time, the applying of the reaction force of manipulation conducted by the reaction force applying actuator 26 is caused to release in deference to the driver's intent. In a case of a vehicle that cannot apply reaction force to the accelerator pedal 24, the driver may be given notice to release the accelerator pedal by using a buzzer, monitor display or the like.

If the engine stop instruction from idling reduction propriety determination unit 55 is received, the engine control unit 30 stops supply of a fuel injection (drive) pulse signal to the fuel injection valve 31, and stops supply of an ignition signal to the ignition unit 33 as well. The engine control unit conducts necessary processing such as opening the electronic control throttle valve 34 fully. As a result, the engine is stopped.

If the engine restart instruction from idling reduction propriety determination unit 55 is received, the engine control unit 30 opens the electronic control throttle valve, starts cranking, reopens supply of the fuel injection (drive) pulse signal to the fuel injection valve 31, and reopens supply of the ignition signal to the ignition unit 33 as well. As a result, the engine is restarted.

In addition, when outputting the engine stop instruction to the engine control unit 30, the idling reduction propriety determination unit 55 outputs an engine interception instruction to the transmission control unit 40 simultaneously. When outputting the engine restart instruction, the idling reduction propriety determination unit 55 outputs an engine connection instruction to the transmission control unit 40 simultaneously. As a result, at the time of engine stop, the engine 10 is disconnected from the transmission 12 mechanically. Since the engine brake is not applied, the traveling resistance is decreased. After the engine restart, the engine 10 is connected to the transmission 12 and ordinary power transmission is conducted.

Figure 5:
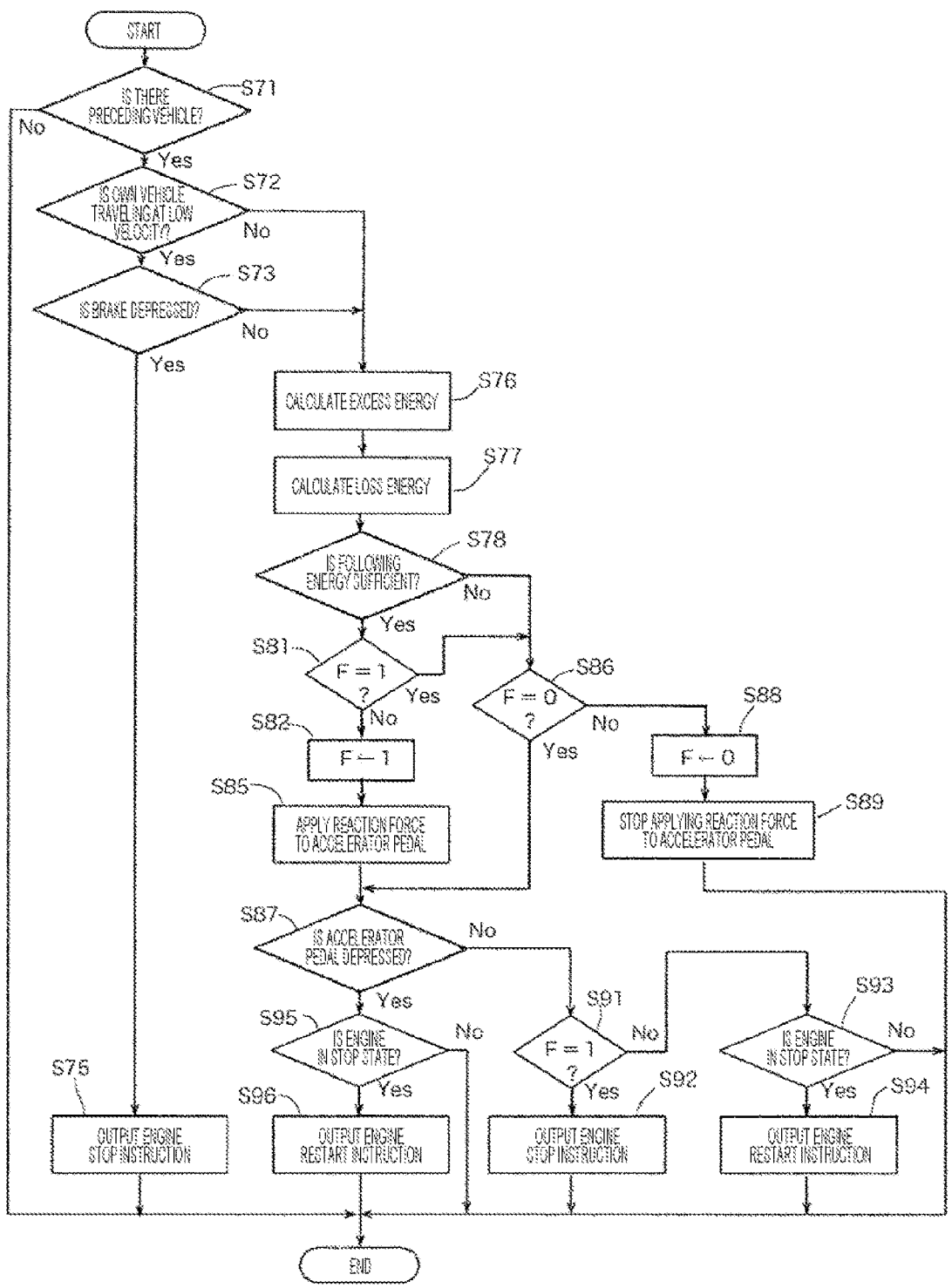
FIG. 5 is a flow chart illustrating processing contents of a traveling idling reduction control routine at the time of traveling following a preceding vehicle executed by a vehicle integrated control unit and an example of a procedure thereof.

Processing contents of a traveling (traveling following the preceding vehicle) idling reduction control routine executed by the vehicle integrated control unit 20, and an example of a procedure thereof will be described with reference to a flowchart in FIG. 5. This routine is executed repetitively every predetermined time (period).

First, in step S71 (hereafter "step" is omitted), it is determined whether there is a preceding vehicle ahead of the own vehicle on the basis of signal data from the stereo camera 17. In a case where there is not a preceding vehicle, idling reduction control at the time of traveling (at the time of traveling following preceding vehicle) is not exercised, and consequently this routine is finished. In a case where there is a preceding vehicle, the processing proceeds to S72.

In S72, it is determined whether the own vehicle is traveling at low velocity. In a case where the own vehicle is traveling at low velocity, the processing proceeds to S73. In a case where the own vehicle is not traveling at low velocity, i.e., the own vehicle is traveling at high velocity, the processing proceeds to S76 without passing through S73.

In S73, it is determined whether the driver is depressing the brake pedal 27. In a case where the driver is depressing the brake pedal 27, the processing proceeds to S75, where an engine stop instruction is output to the engine control unit 30. In a case where the driver is not depressing the brake pedal 27, the processing proceeds to S76.

The reason why the processing proceeds to S76 without passing through S73 in the case where the vehicle is traveling at high velocity as described above will now be described. That is, during high velocity traveling, the engine cannot be stopped under the condition that the driver manipulates the brake pedal. This is because time required to restart the engine in a high velocity area cannot be compensated by transition time from brake pedal manipulation of the driver to accelerator pedal manipulation in some cases.

In S76, excess kinetic energy, which is a difference between the kinetic energy of the own vehicle and the predicted kinetic energy of the own vehicle in the case where the own vehicle is supposed to travel at the velocity V of the preceding vehicle, is calculated on the basis of the weight m of the own vehicle and the velocity v of the own vehicle as described as regards the calculation unit 51.

In subsequent S77, loss kinetic energy of the own vehicle is calculated on the basis of the weight m of the own vehicle, the predicted deceleration A or traveling resistance of the own vehicle, the distance L between the own vehicle and the preceding vehicle, and the relative height h of the preceding vehicle as described as regards the calculation unit 52.

In subsequent S78, it is determined whether kinetic energy (kinetic energy for following) enough for the own vehicle to follow the preceding vehicle with inertial traveling is sufficient or insufficient on the basis of the excess kinetic energy and the loss kinetic energy as described as regards the determination unit 53. If the excess kinetic energy is larger than the loss kinetic energy, it is determined that the kinetic energy for following is sufficient and the processing proceeds to S81. If the excess kinetic energy is smaller than the loss kinetic energy, it is determined that the following kinetic energy is insufficient and the processing proceeds to S86.

In S81, to which the processing proceeds in the case where it is determined that the kinetic energy for following is sufficient, it is determined whether a following kinetic energy sufficient flag F is already set (=1). Unless F=1, F is set (←1) in S82 and the processing proceeds to S85.

In S85, the following kinetic energy is sufficient, and consequently the accelerator pedal reaction force applying actuator 26 and causes the actuator 26 to apply manipulation force in addition to the ordinary restoration force to the accelerator pedal 24. This manipulation is conducted to urge the driver to release the accelerator pedal 24 to travel with inertia by applying the reaction force to the accelerator pedal 24 as described earlier.

On the other hand, in S86 to which the processing proceeds in the case where it is determined in S78 that the following kinetic energy is insufficient, it is determined whether the following kinetic energy sufficient flag F is already reset (=0). If F=0, the processing proceeds to S87 without passing through S85 (without applying reaction force of manipulation to the accelerator pedal 24).

In a case where it is determined in S81 that F=1, the processing also proceeds to S86. In a case where it is determined in S86 that F=0 is not satisfied, it is meant that the kinetic energy for following has changed from the sufficient state to the insufficient state between the last time and this time. In S88, therefore, F is reset (←0) and the processing proceeds to S89.

In S89, the kinetic energy for following is in the insufficient state and it becomes unnecessary to urge the driver to release the accelerator pedal 24. Therefore, the reaction force applying actuator 26 is caused to release applying reaction force of manipulation and this routine is finished. When the accelerator pedal 24 is depressed increasingly though the reaction force of manipulation is continued to be applied, or when the accelerator pedal 24 is continued to be depressed over at least predetermined time, in a routine different from the present routine, the application of the reaction force of manipulation conducted by the reaction force applying actuator 26 is caused to release in deference to the driver's intent. Once applying reaction force of manipulation is released, the reaction force applying actuator 26 maintains the release state until an activation instruction (signal) reaches the next time.

On the other hand, in S87 subsequent to S85, it is determined whether the accelerator pedal 24 is depressed. In a case where the accelerator pedal 24 is not depressed, the processing proceeds to S91 to determine whether F=1, i.e., whether the kinetic energy for following is sufficient or insufficient. In a case where the kinetic energy for following is sufficient, the processing proceeds to S92 to output an engine stop instruction and finish this routine.

In a case where it is determined in S91 that the kinetic energy for following is insufficient (F=0), the processing proceeds to S93 to determine whether the engine is in the stop state. If the engine is in the stop state, the processing proceeds to S94 to output an engine restart instruction and finish this routine. Unless the engine is in the stop state, i.e., if the engine is operating (rotating), this routine is finished without doing anything (once the engine restart instruction is issued, it is not necessary to issue the engine restart instruction repetitively).

In a case where it is determined in S87 that the accelerator pedal 24 is depressed, it is determined in subsequent S95 whether the engine is in the stop state. If the engine is in the stop state, an engine restart instruction is output in S96 and this routine is finished. Unless the engine is in the stop state, i.e., if the engine is operating (rotating), this routine is finished without doing anything.

Traveling idling reduction control at the time of traveling following the preceding vehicle according to the embodiment of the present invention will now be described by taking concrete traveling patterns (FIGS. 6 to 10) as examples.

Figure 6:
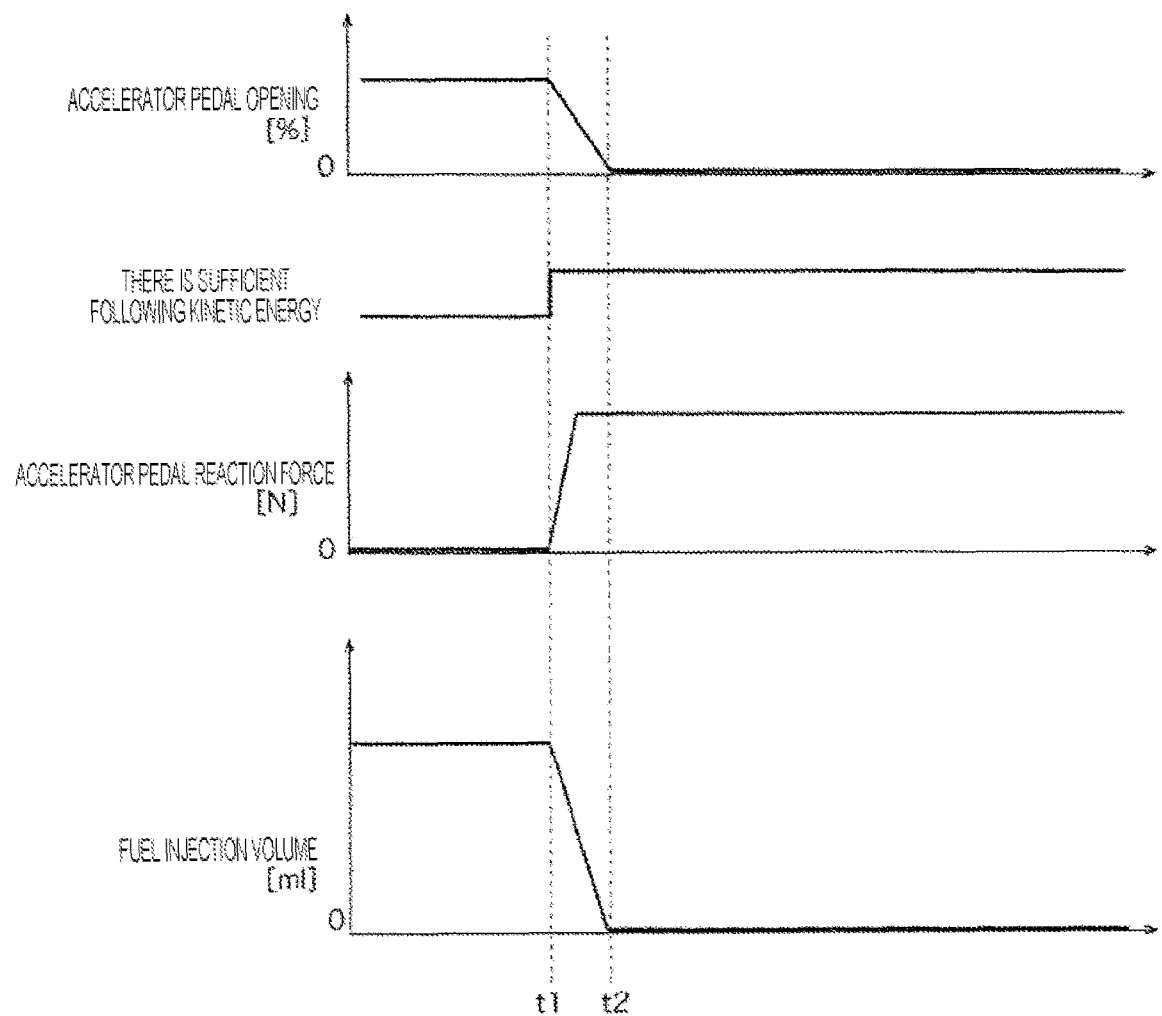
FIG. 6 is a time chart used to describe a traveling pattern 1 resulting from traveling idling reduction control at the time of traveling following a preceding vehicle in the embodiment of the present invention.

As for traveling pattern 1 illustrated in FIG. 6, the own vehicle travels at constant velocity until a time point t1. Although the preceding vehicle is decelerating, the kinetic energy for following is insufficient. At the time point t1, a state in which the kinetic energy for following is sufficient is brought about, and reaction force is applied to the accelerator pedal 24. The driver releases the accelerator pedal 24 at a time point t2 in accordance with the reaction force of the accelerator pedal 24.

As a result, the traveling idling reduction condition is satisfied, and fuel injection is stopped and the engine is stopped. With respect to such a traveling pattern, in the conventional traveling idling reduction control, the driver is hard to be aware of accelerating excessively. Therefore, the possibility that the driver continues to depress the accelerator pedal 24 even after t1 is high, and the fuel consumption is worsened in some cases. Furthermore, in the conventional traveling idling reduction control, the idling state is kept until the brake pedal 27 is depressed, even in a state in which the accelerator pedal 24 is released like after the time point t2, resulting in a worsened fuel consumption (the fuel consumption is worsened as the time elapsed until the brake pedal 27 is depressed becomes longer).

Figure 7:
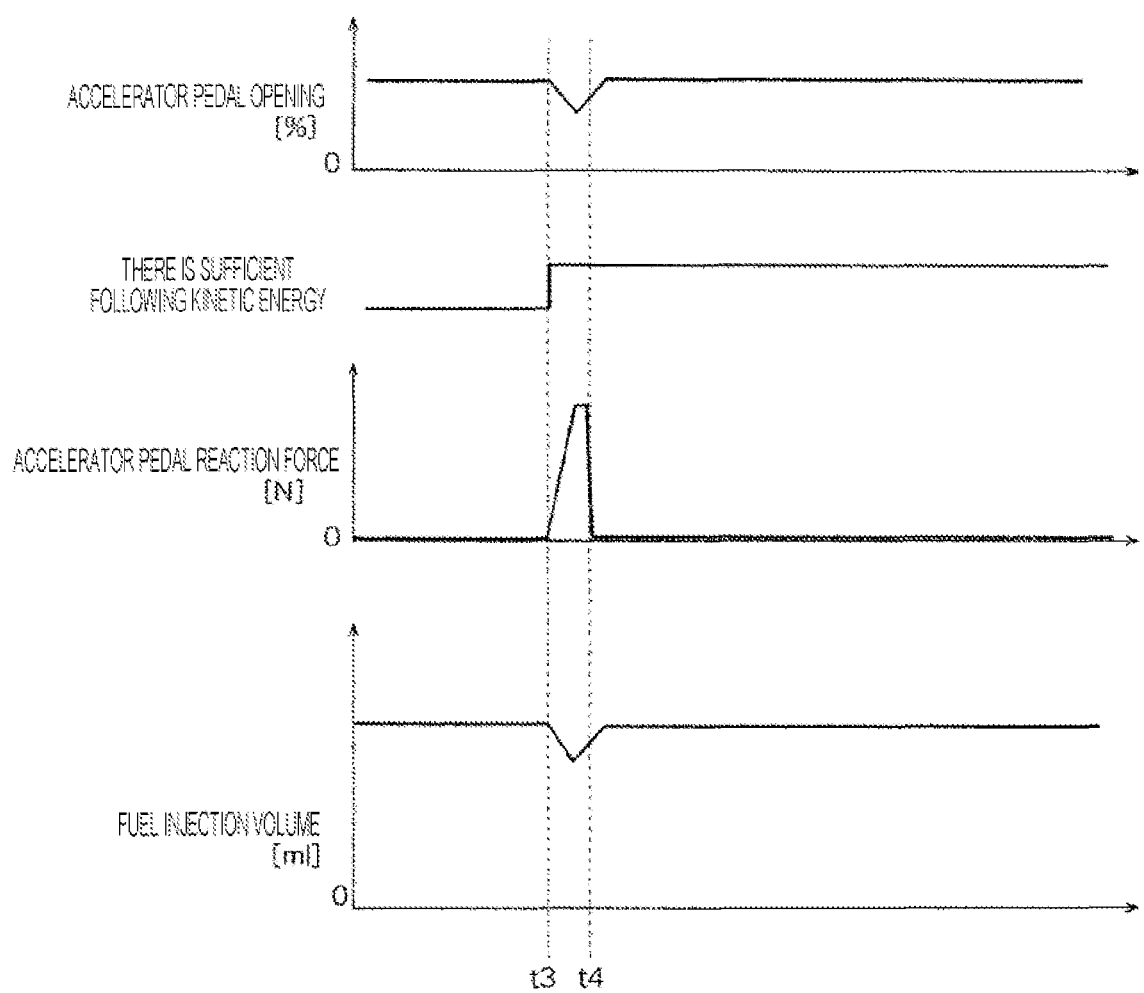
FIG. 7 is a time chart used to describe a traveling pattern 2 resulting from traveling idling reduction control at the time of traveling following a preceding vehicle in the embodiment of the present invention.

In a traveling pattern 2 illustrated in FIG. 7, the own vehicle travels at constant velocity until a time point t3. Although the preceding vehicle is decelerating, the kinetic energy for following is insufficient. At the time point t3, a state in which the kinetic energy for following is sufficient is brought about, and reaction force is applied to the accelerator pedal 24. However, the driver depresses increasingly against the reaction force on the accelerator pedal 24 to pass the preceding vehicle ahead.

In this case, the intent of the driver is given priority. Even if the kinetic energy for following is sufficient, the engine is not stopped. In such traveling pattern 2, little difference in fuel consumption from the conventional traveling idling reduction control is brought about. However, the traveling pattern 2 differs from the conventional traveling idling reduction control in that the intention of the driver is confirmed. By the way, the driver depresses increasingly against the reaction force of the accelerator pedal 24 as described above. Immediately thereafter, therefore, applying the reaction force of manipulation conducted by the reaction force applying actuator 26 is releases in deference to the driver's intent.

Figure 8:
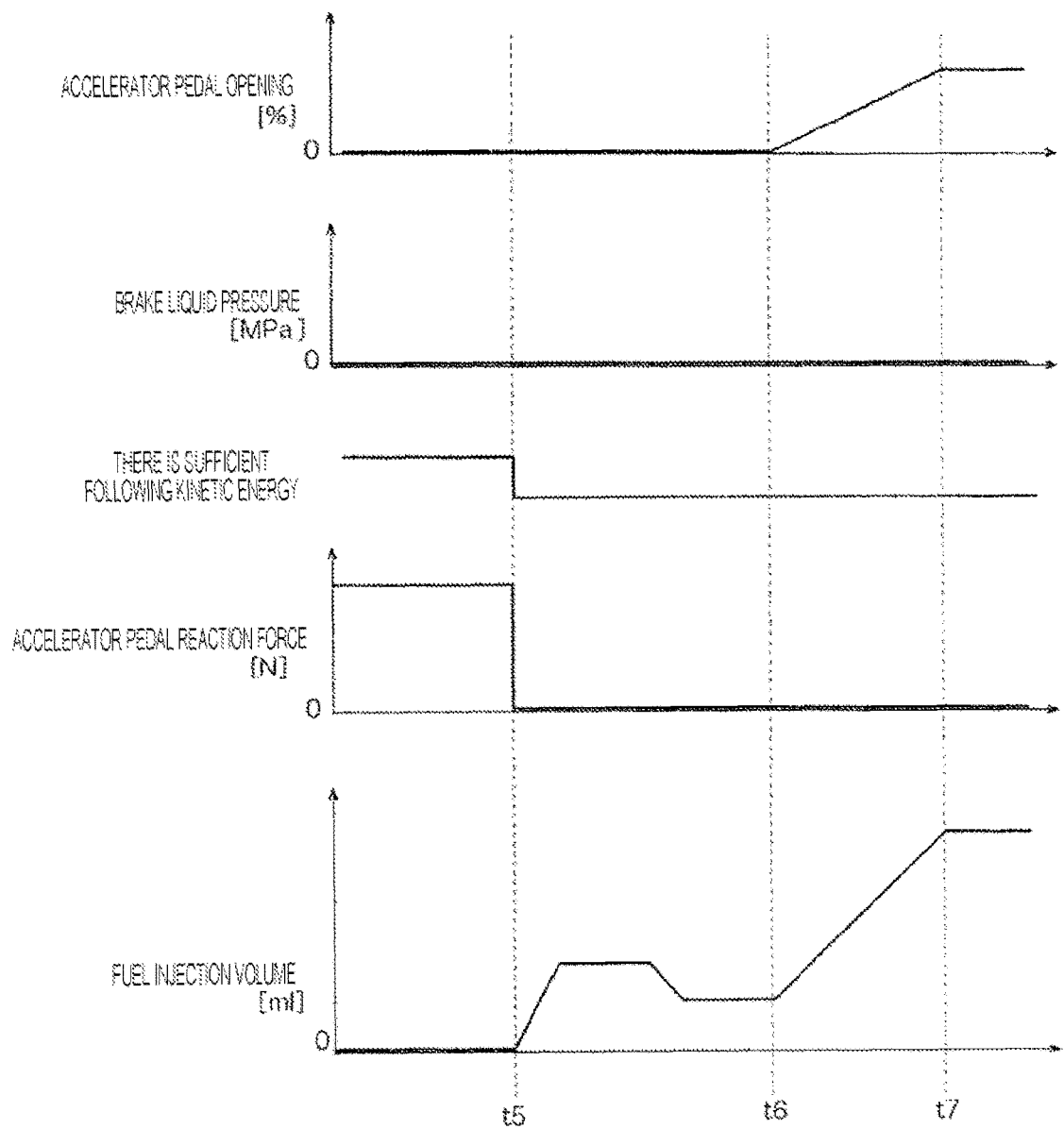
FIG. 8 is a time chart used to describe a traveling pattern 3 resulting from traveling idling reduction control at the time of traveling following a preceding vehicle in the embodiment of the present invention.

In a traveling pattern 3 illustrated in FIG. 8, the preceding vehicle accelerates until a time point t5. Since the velocity of the own vehicle is large, however, the own vehicle approaches the preceding vehicle with inertia. Since the kinetic energy for following is sufficient, the engine is in the stop state. After a time point t5, the kinetic energy for following becomes insufficient and consequently the engine is restarted. After a time point t6, the driver begins to depress the accelerator pedal 24 to accelerate and follow the preceding vehicle.

With respect to such traveling pattern 3, in the conventional traveling idling reduction control, an idling state continues until the time point t5, because the brake pedal 27 is not depressed. As a result, the fuel consumption is worsened. In the embodiment according to the present invention, however, the fuel consumption is improved.

Figure 9:
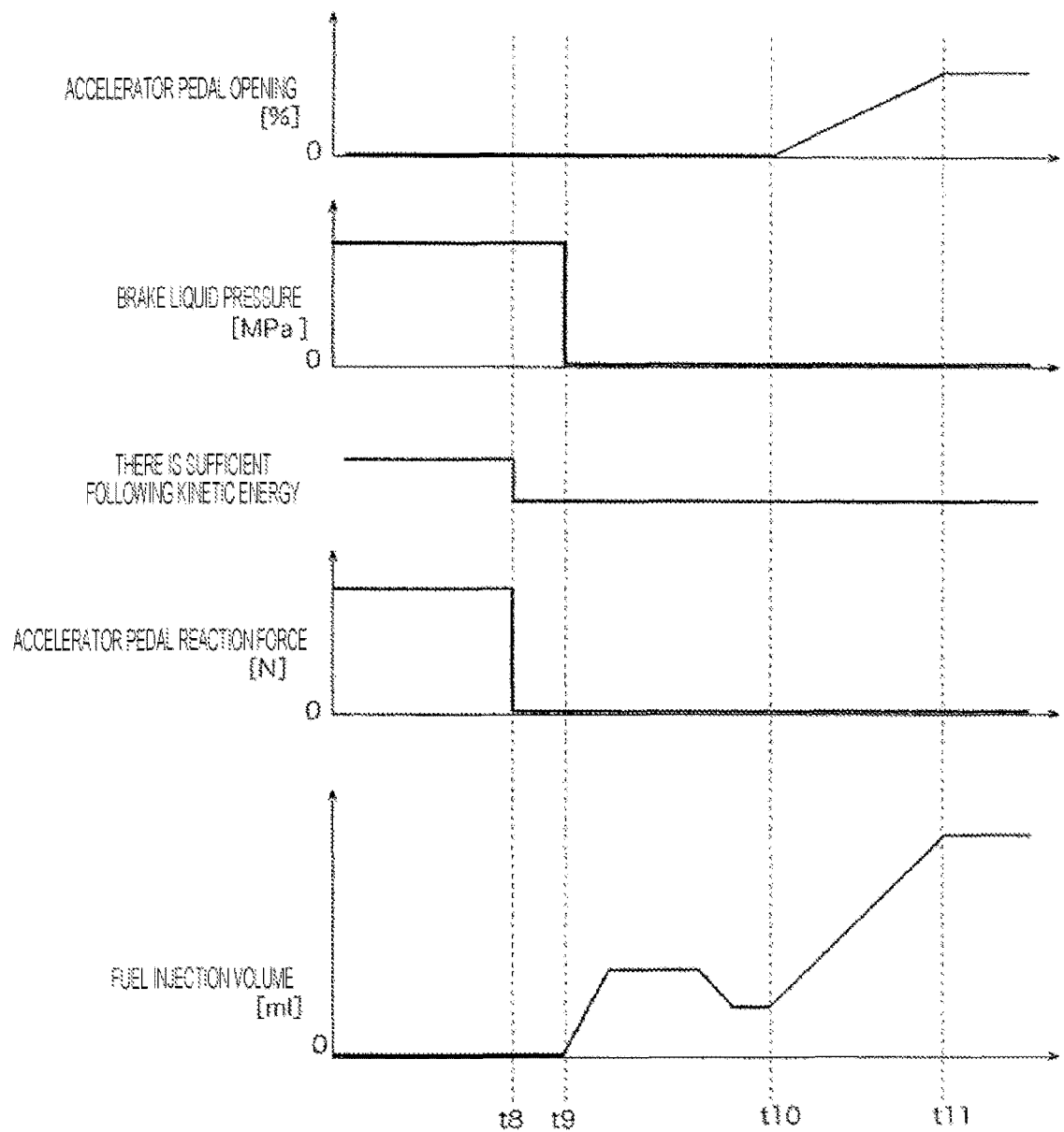
FIG. 9 is a time chart used to describe a traveling pattern 4 resulting from traveling idling reduction control at the time of traveling following a preceding vehicle in the embodiment of the present invention.

In a traveling pattern 4 illustrated in FIG. 9, the own vehicle is traveling at low velocity. Until a time point t8, the preceding vehicle is accelerating. Since the velocity of the own vehicle is large, however, the own vehicle is approaching with brake deceleration. Since the kinetic energy for following is sufficient, the engine is in the stop state.

After the time point t8, the kinetic energy for following is in the insufficient state. Since the driver continues the brake deceleration, however, the engine stop is maintained until a time point t9. At the time point t9, the driver releases the brake and consequently the engine is restarted. At a time point t10, the driver begins to depress the accelerator pedal 24 and accelerates to follow the preceding vehicle.

In such traveling pattern 4, the same control as the conventional traveling idling reduction control is exercised. As a result, the fuel consumption is not worsened more than the conventional traveling idling reduction control.

Figure 10:
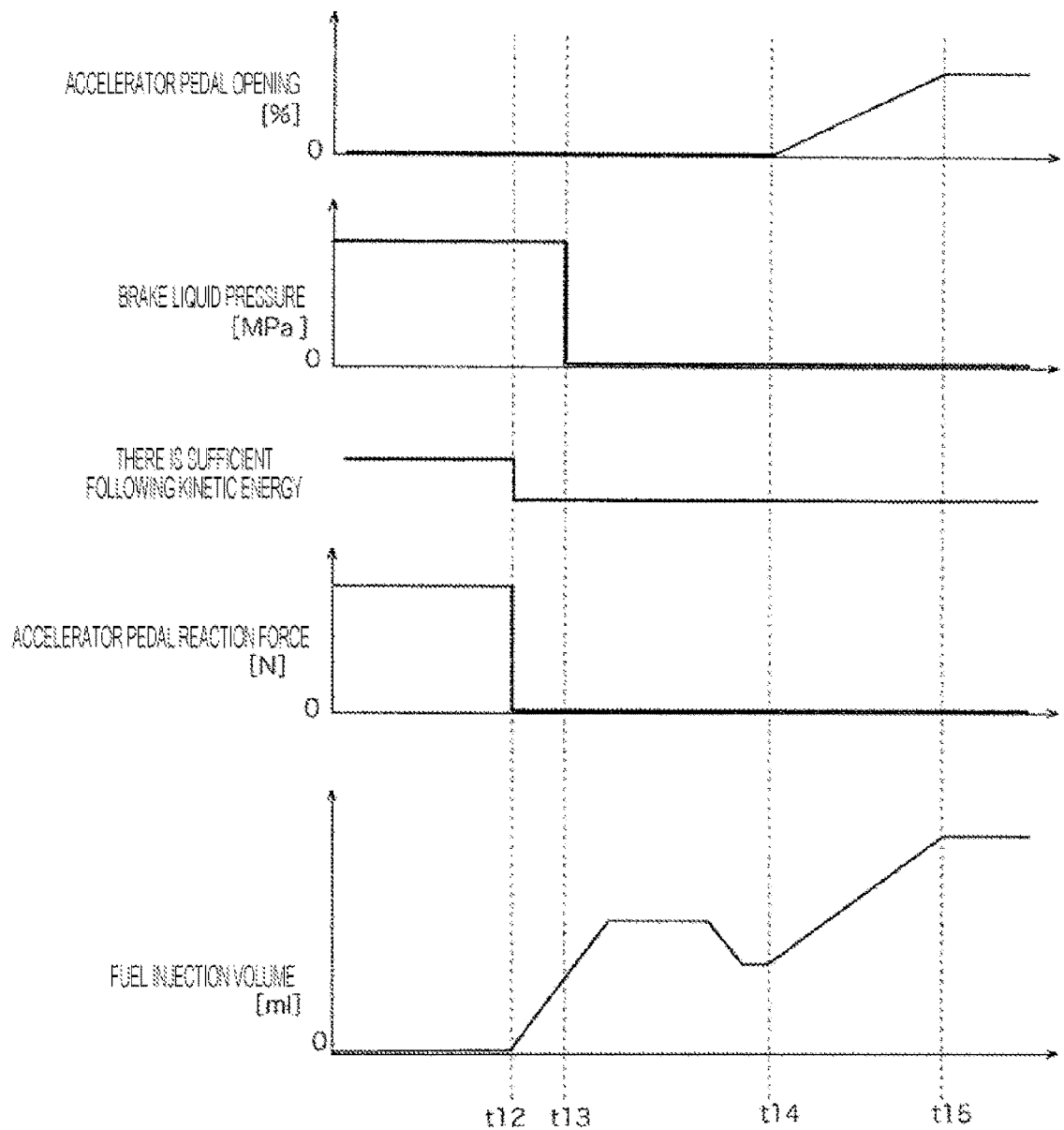
FIG. 10 is a time chart used to describe a traveling pattern 5 resulting from traveling idling reduction control at the time of traveling following a preceding vehicle in the embodiment of the present invention.

In a traveling pattern 5 illustrated in FIG. 10, the own vehicle is traveling at high velocity. Until a time point t12, the preceding vehicle is accelerating. Since the vehicle of the own vehicle is large, however, the own vehicle is approaching with brake deceleration. Since the kinetic energy for following is sufficient, the engine is in the stop state.

After the time point t12, the kinetic energy for following is insufficient and consequently the engine is restarted regardless of brake pedal manipulation (brake release manipulation at a time point t13 has no relation to the present control). At a time point t14, the driver begins to depress the accelerator pedal 24 and accelerates to follow the preceding vehicle.

With respect to such traveling pattern 5, in the conventional traveling idling reduction control, the engine cannot be stopped until the time point t12 as described above. As a result, the fuel consumption is worsened. In the present embodiment of the invention, however, the engine can be stopped even during high velocity traveling and consequently the fuel consumption can be improved.

Even if the driver releases the brake pedal 27 during the traveling idling reduction (engine stop) in the vehicle control apparatus 5 according to the present embodiment of the present invention, the engine can be continued to be stopped in this way in the case where the own vehicle has kinetic energy for following enough for the own vehicle to be able to follow the preceding vehicle with inertial traveling.

Furthermore, in the case where the kinetic energy for following becomes insufficient during the engine stop, the engine is adapted to be restarted. Therefore, the engine can be restarted before the driver begins to depress the accelerator pedal 24. It is possible to prevent the driver from feeling acceleration delay of engine start.

In addition, it is possible to restart the engine before the driver begins to depress the accelerator pedal 24 as described above. Therefore, the engine can be stopped even at the time of traveling at high velocity when the delay time required to start the engine cannot be compensated completely by transition time of the driver from the brake pedal manipulation to the accelerator pedal manipulation.

In addition, when the following kinetic energy is sufficient, the reaction force applying actuator 26 is activated to apply reaction force of manipulation to the accelerator pedal 24. Therefore, it is possible to urge the driver to release the accelerator pedal 24 and travel with inertia. As a result, it is possible to prevent the driver from conducting acceleration manipulation excessively.

When the accelerator pedal 24 is depressed increasingly although the reaction force of manipulation continues to be applied, or when the accelerator pedal 24 continues to be depressed for at least predetermined time, the intention of the driver is given priority and applying the reaction force of manipulation conducted by the reaction force applying actuator 26 is released.

In the vehicle 1 including the vehicle control apparatus 5 according to the present embodiment, it is possible to suppress energy consumption as far as possible without reducing drivability at the time of traveling following a preceding vehicle and consequently it is possible to attempt fuel consumption improvement and exhaust gas reduction effectively without causing a sense of incompatibility in the driver.

Heretofore, the embodiment of the present invention has been described with reference to the drawings. However, a concrete configuration is not restricted to the embodiment. Even if there are changes without departing from the spirit of the present invention, they are incorporated in the present invention.

For example, in the above-described embodiment, the case where the present invention is applied to a gasoline engine vehicle has been described. However, the present invention is not restricted to the gasoline engine vehicle, but the present invention can be applied to a diesel engine vehicle, a hybrid vehicle, and the like in the same way.

REFERENCE SIGNS LIST 1 vehicle
5 vehicle control apparatus
10 engine
12 transmission
17 stereo camera
20 vehicle integrated control unit
21 wheel velocity sensor
24 accelerator pedal
25 accelerator pedal opening sensor
26 reaction force applying actuator
27 brake pedal
28 brake sensor
30 engine control unit
31 fuel injection valve
33 ignition unit
34 electronic control throttle valve
40 transmission control unit
51 excess kinetic energy calculation unit
52 loss kinetic energy calculation unit
53 following kinetic energy existence determination unit
55 idling reduction propriety determination unit 55

The invention claimed is:

1. A vehicle control apparatus comprising:
a control means that controls an accelerator pedal; and
means for calculating excess kinetic energy, wherein
the vehicle control apparatus being configured to temporarily stop an engine mounted on a vehicle, when a driving and traveling state of an own vehicle satisfies predetermined conditions during traveling following a preceding vehicle, and
the excess kinetic energy is a difference between a kinetic energy of the own vehicle and a predicted kinetic energy of the own vehicle when the own vehicle travels at a same velocity as a velocity of the preceding vehicle, the excess kinetic energy being calculated based on a mass of the own vehicle the velocity of the own vehicle;
means for calculating a loss of kinetic energy of the own vehicle based on: i) the mass of the own vehicle, ii) the velocity of the own vehicle, iii) a predicted deceleration and a traveling resistance of the own vehicle, iv) a distance between the own vehicle and the preceding vehicle, and v) a difference between a current position of the own vehicle and a current position of the preceding vehicle along a vertical direction; and
means for determining whether there is sufficient kinetic energy available for the own vehicle to follow the preceding vehicle with inertial traveling, the determining being carried out based on the calculated excess kinetic energy and loss kinetic energy, wherein
there is sufficient kinetic energy when the excess kinetic energy is larger than the loss kinetic energy; and
control means for stopping the engine when: i) the determining means determines that the kinetic energy is sufficient and the driving and traveling state of the own vehicle satisfies the predetermined conditions, and ii) the accelerator pedal of the own vehicle is not depressed.

2. The vehicle control apparatus according to claim 1, wherein when the determining means determines that the kinetic energy is insufficient during the engine stop, the control means for stopping the engine restarts the engine.

3. The vehicle control apparatus according to claim 2, wherein when depression of the accelerator pedal is detected during engine stop, the control means for stopping the engine restarts the engine.

4. The vehicle control apparatus according to claim 3, wherein
when the determining means determines that the kinetic energy is sufficient, the control means that controls the accelerator pedal applies a reaction force of manipulation in addition to an ordinary restoration force to the accelerator pedal, and
when it is determined that the kinetic energy is insufficient and the accelerator pedal is depressed increasingly though the reaction force of manipulation is continued to be applied, or when the accelerator pedal is continued to be depressed over at least predetermined time, the control means that controls the accelerator pedal stops the application of the reaction force of manipulation.

\* \* \* \* \*